US008838865B2

(12) United States Patent
Daniel

(10) Patent No.: US 8,838,865 B2
(45) Date of Patent: Sep. 16, 2014

(54) HOT PLUG AD HOC COMPUTER RESOURCE ALLOCATION

(75) Inventor: David A. Daniel, Scottsdale, AZ (US)

(73) Assignee: Nuon, Inc., Scottsdale, AZ (US)

( * ) Notice: Subject to any disclaimer, the term of this patent is extended or adjusted under 35 U.S.C. 154(b) by 0 days.

(21) Appl. No.: 12/587,779

(22) Filed: Oct. 13, 2009

(65) Prior Publication Data

US 2010/0106881 A1 Apr. 29, 2010

Related U.S. Application Data

(60) Provisional application No. 61/195,855, filed on Oct. 10, 2008.

(51) Int. Cl.
| G06F 13/00 | (2006.01) |
| G06F 13/40 | (2006.01) |
| G06F 9/44 | (2006.01) |
| H04W 28/02 | (2009.01) |

(52) U.S. Cl.
CPC .......... *G06F 13/4081* (2013.01); *G06F 9/4413* (2013.01); *H04W 28/021* (2013.01)
USPC .......................................... 710/302; 710/313

(58) Field of Classification Search
CPC . G06F 13/4081; G06F 9/4411; G06F 9/4413; H04W 28/021
USPC .................. 710/100, 300–305, 306, 313–315
See application file for complete search history.

(56) References Cited

U.S. PATENT DOCUMENTS

| 7,107,378 | B1* | 9/2006 | Brewer et al. ................. 710/300 |
| 7,454,549 | B2* | 11/2008 | Chari et al. ................... 710/302 |
| 7,558,903 | B2* | 7/2009 | Kinstler ......................... 710/315 |
| 7,680,087 | B2* | 3/2010 | Chen et al. .................... 370/338 |
| 7,836,129 | B2* | 11/2010 | Freimuth et al. .............. 709/205 |
| 8,000,313 | B1* | 8/2011 | Shah et al. ..................... 370/350 |
| 2005/0125523 | A1* | 6/2005 | Hickerson et al. ............ 709/223 |
| 2005/0147117 | A1* | 7/2005 | Pettey et al. .................. 370/463 |
| 2006/0143621 | A1* | 6/2006 | Wang ............................. 719/327 |
| 2007/0186025 | A1* | 8/2007 | Boyd et al. .................... 710/305 |
| 2007/0198763 | A1* | 8/2007 | Suzuki et al. ................. 710/316 |
| 2008/0040526 | A1* | 2/2008 | Suzuki et al. ................. 710/302 |
| 2008/0192648 | A1* | 8/2008 | Galles ........................... 370/254 |
| 2008/0192750 | A1* | 8/2008 | Ko et al. ..................... 370/395.3 |
| 2009/0276773 | A1* | 11/2009 | Brown et al. ..................... 718/1 |

OTHER PUBLICATIONS

"Ad hoc", Foldoc Free Online Dictionary of Computing, Mar. 25, 1995, 1 page.*
IEEE 802.15.3 Standard; IEEE Computer Society; The Institute of Electrical and Electronics Engineers, Inc.; New York, NY; Sep. 29, 2003; pp. 1-2.*

* cited by examiner

*Primary Examiner* — Glenn A Auve
(74) *Attorney, Agent, or Firm* — Robert C. Klinger

(57) ABSTRACT

An adapter card adapting the ad hoc resource add/removal inherent to a host PCI or PCI Express-based system to a wireless link and wireless endpoint. The adaptation allows mobile PCI Express resources to ingress and be allocated system resources within a host's PCI system and then egress and have the allocated resources freed up for re-use/reassignment, emulating the hot plug insertion and removal of an adapter card.

The invention leverages the i-PCI protocol as defined by U.S. patent application Ser. No. 12/148,712, filed Apr. 21, 2008, the teachings which are incorporated by reference.

14 Claims, 4 Drawing Sheets

HOT PLUG AD HOC COMPUTER RESOURCE ALLOCATION

CLAIM OF PRIORITY

This application claims priority of U.S. Provisional Patent Application Ser. No. 61/195,855 entitled "HOT PLUG AD HOC COMPUTER RESOURCE ALLOCATION" filed Oct. 10, 2008, the teachings of which are incorporated herein by reference.

The present invention relates to extension of a computer's native system bus via high speed data networking protocols, and specifically to techniques for adding and removing resources via wireless networking.

BACKGROUND OF THE INVENTION

There is growing acceptance of techniques that leverage networked connectivity for extending the resources of host computer systems. In particular, networked connectivity is being widely utilized for specialized applications such as attaching storage to computers. iSCSI makes use of TCP/IP as a transport for the SCSI parallel bus to enable low cost remote centralization of storage. The problem with iSCSI is it has a relatively narrow (storage) focus and capability.

PCI Express, as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific Input/Output (I/O) functions. A limitation of PCI Express is that it is limited to direct attach expansion.

A hardware/software system and method that collectively enables virtualization of the host bus computer's native I/O system architecture via the Internet, LANs, WANs, and WPANs is described in commonly assigned U.S. patent application Ser. No. 12/148,712, now U.S. Pat. No. 7,734,859. The system described, designated "i-PCI", achieves technical advantages as a system and method that collectively enables virtualization of the host computer's native I/O system architecture via the Internet, LANs, WANs, and WPANs. The system includes a solution to the problems of the relatively narrow focus of iSCSI, the direct connect limitation of PCI Express.

The i-PCI solution allows devices native to the host computer native I/O system architecture—including bridges, I/O controllers, and a large variety of general purpose and specialty I/O cards—to be located remotely from the host computer, yet appear to the host system and host system software as native system memory or I/O address mapped resources. The end result is a host computer system with unprecedented reach and flexibility through utilization of LANs, WANs, WPANs and the Internet.

Referring to FIG. 1, the i-PCI solution is a hardware, software, and firmware architecture that collectively enables virtualization of host memory-mapped I/O systems. The i-PCI protocol extends the PCI I/O System via encapsulation of PCI Express packets within network routing and transport layers and Ethernet packets and then utilizes the network as a transport.

For extended systems there is a general desire to eliminate the use of cables if possible. Typically, cable elimination is mentioned for those applications where mobility is required, cabling is judged unsightly, or simplified interconnection is desired. Commonly assign U.S. patent application Ser. No. 12/148,712 disclosed a wireless implementation for computer expansion and I/O virtualization, the teachings which are incorporated by reference.

It is would be highly advantageous if wireless computer system expansion and I/O virtualization could employ ad hoc capability, such that the resources available via a wireless implementation could come and go in manner similar to the way that I/O resources are hot-plugged in a conventional computer system.

SUMMARY OF THE INVENTION

The invention achieves technical advantages by adapting the ad hoc resource add/removal inherent to a host PCI or PCI Express-based system to a wireless link and wireless endpoint. The adaptation allows mobile PCI Express resources to ingress and be allocated system resources within a host's PCI system and then egress and have the allocated resources freed up for re-use/reassignment, emulating the hot-plug insertion and removal of an adapter card.

The invention is a solution for wireless computer system expansion and I/O virtualization where ad hoc I/O resource capability is a concern. In a wireless environment there is currently no mobile scheme for memory-mapped I/O resources, such as those associated with PCI and PCI Express, to come and go in manner similar to the way that I/O resources are hot plugged in a conventional computer system.

In one embodiment, the invention leverages i-PCI as the foundational memory-mapped I/O expansion and virtualization protocol and extends the capability to enable ingress and egress of memory-mapped I/O resources. The net result is unprecedented mobility and dynamic capability for computer system expansion.

DETAILED DESCRIPTION OF THE PRESENT INVENTION

The invention is a hardware and software system that enables a host system's PCI hot-plug capability to be utilized as the mechanism for ingress and egress of computer resources in ad hoc wireless networks.

Figure 1:
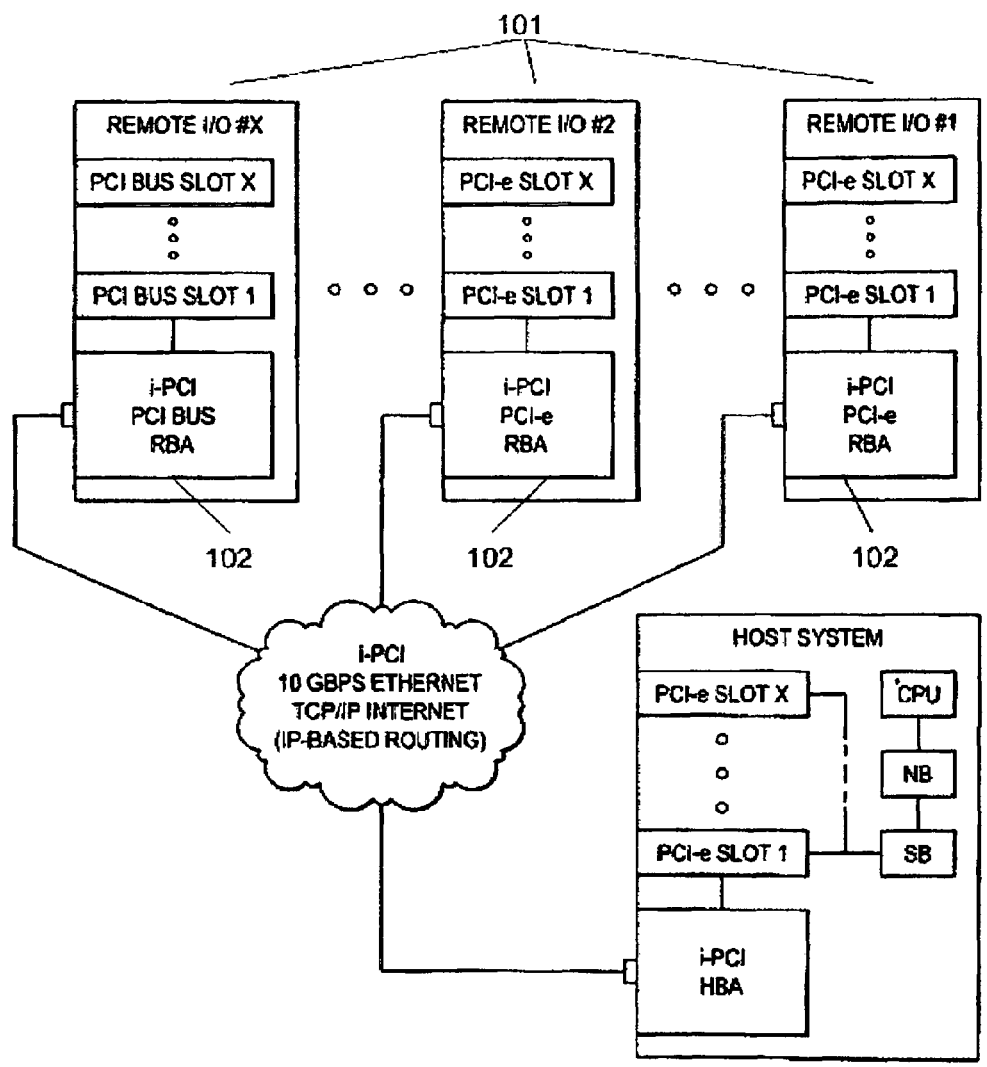
FIG. 1 depicts using the Internet as a means for extending a computer system's native bus via high speed networking.
Figure 2:
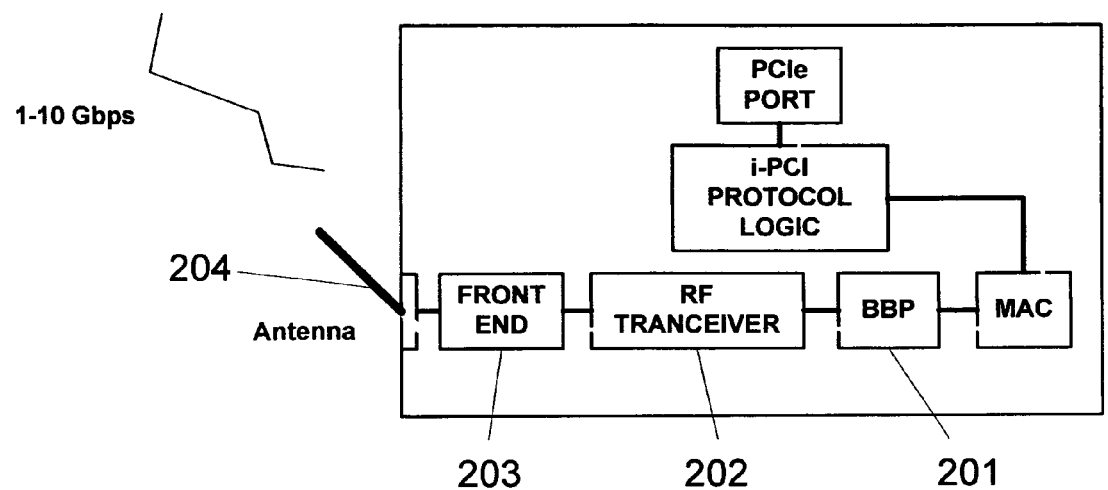
FIG. 2 depicts a wireless version of the Host Bus Adapter and Remote Bus Adapter, showing the major functional blocks that substitute for the PHY in a wired adapter.

The invention leverages the wireless version of the i-PCI network link described in commonly assigned U.S. patent application Ser. No. 12/148,712 and adds ad hoc capability. For the wireless version, instead of a hardwired Ethernet link, a wireless link is substituted. In a physical realization, this amounts to a wireless version of the Host Bus Adapter (HBA) and Remote Bus Adapter (RBA). Referring to FIG. 2, a wireless version of the adapters is realized, where a Baseband Processor (BBP) 201, RF transceiver 202, Front End 203, and antenna 204 is substituted for a 1000 BASE-T PHY.

Figure 3:
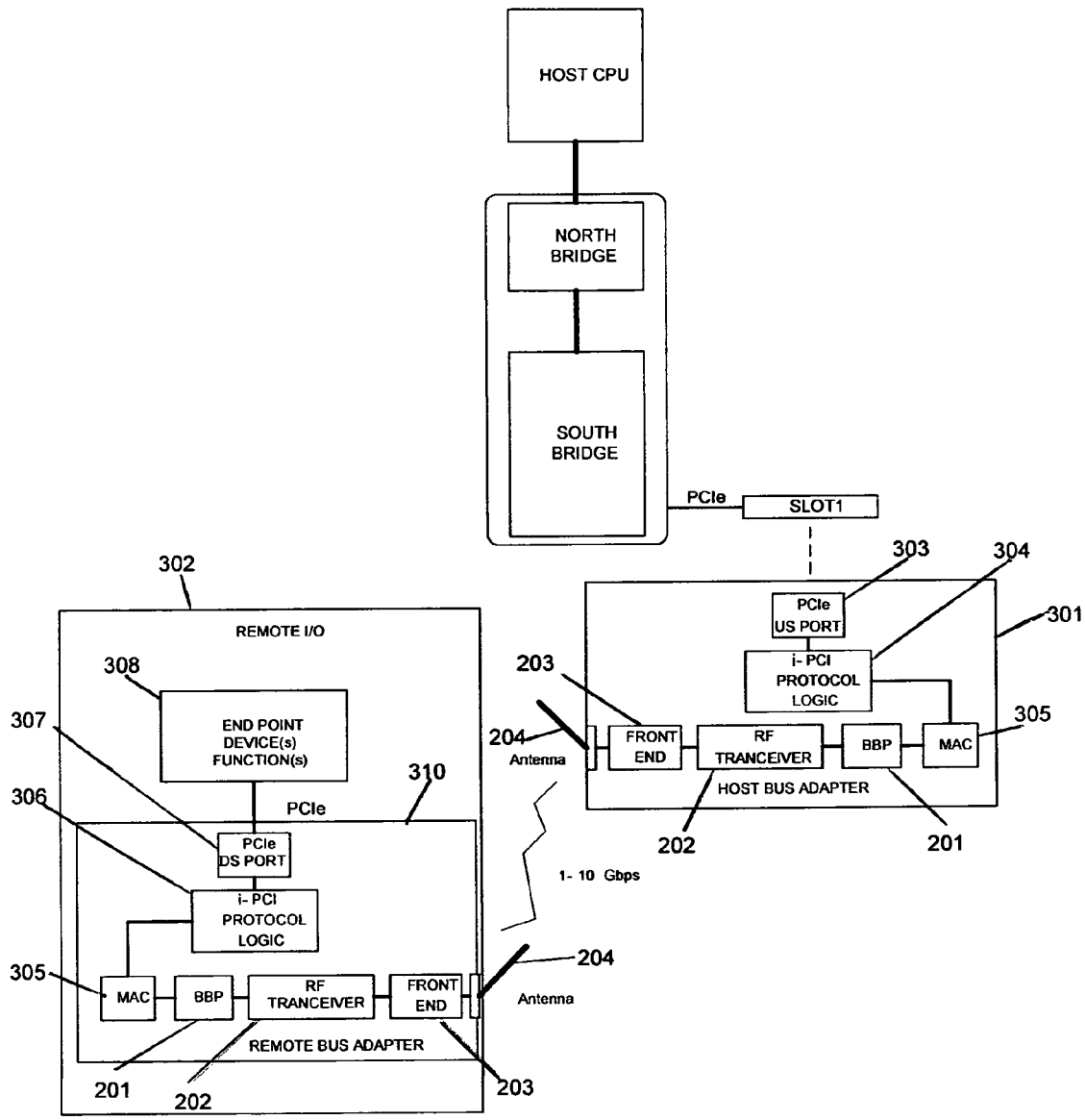
FIG. 3 depicts direct expansion of a host system via a mmWave piconet wireless link.

In one preferred embodiment, the invention utilizes an 802.15.3c "mmWave" link for direct expansion of a host system via a mmWave piconet as shown in FIG. 3. Although a single remote I/O 302 is depicted, more than the one remote I/O may be present on a mmWave piconet.

The HBA 301 contains functional blocks: PCIe upstream port 303, HBA i-PCI protocol logic 304, MAC 305, BBP 204, RF Transceiver 205, Front End 206, and Antenna 207.

The RBA 310 contains functional blocks: PCIe downstream port 307, i-PCI protocol logic 306, MAC 305, BBP 201, RF Transceiver 202, Front End 203, and Antenna 204. The Remote I/O 302 also includes any allowed End Point devices and function(s) 308 per the PCI Express specification.

U.S. patent application Ser. No. 12/148,712 describes the complete functionality of the HBA, RBA, and the i-PCI protocol logic, the teachings which are incorporated by reference.

The Remote I/O 302 may include PCI Express slots to accommodate adapter cards or may simply include a PCI Express device and function(s) incorporated on an integrated circuit. The integrated circuit approach is typically utilized in a small handheld or mobile Remote I/O. The small mobile remote I/O that may readily ingress and egress the general vicinity of a computer system is the focus of the invention.

Figure 4:
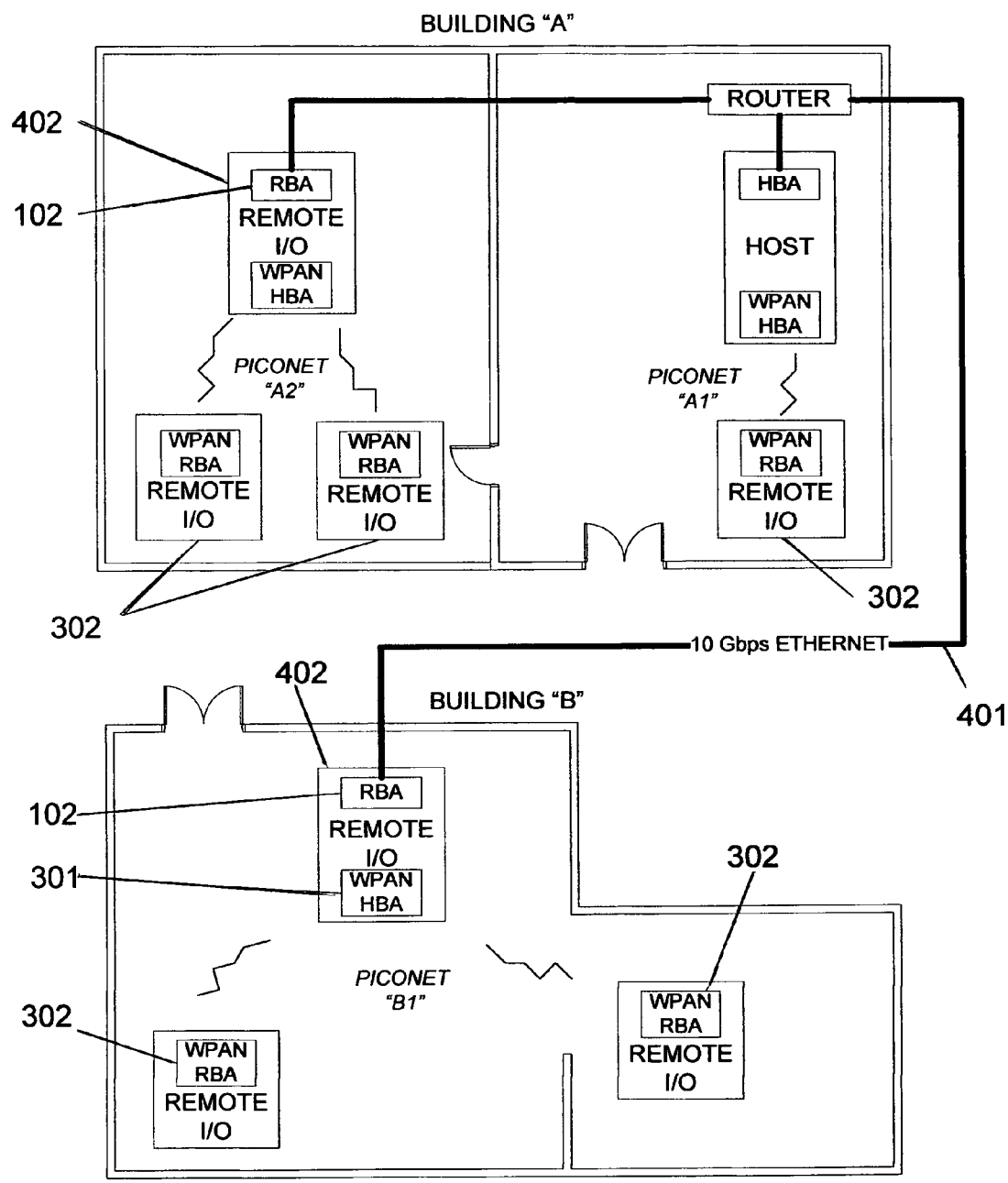
FIG. 4 depicts a hardwired 10 Gbps Ethernet network which is utilized as a backbone between a host system and remotely located wireless access points.

In a second preferred embodiment, referring to FIG. 4, a hardwired 10 Gbps Ethernet network 401 is utilized as a backbone between a host system and remotely located wireless access points 402. The wireless access points include both a conventional RBA function 102, (as disclosed in U.S. patent application Ser. No. 12/148,712) for interfacing to the 10 Gbps Ethernet backbone and a wireless HBA 301 for expansion via an 802.12.3c mmWave piconet. The access points serve as the piconet coordinator, providing the basic timing and beacon for the piconet per 802.15.3c.

Note that all the remote resources, regardless of physical location, appear to the host system and host software as native system memory or I/O address mapped local resources.

A primary emphasis of the 802.15.3 standard is ad hoc capability and bandwidth sharing among multiple devices via a TDMA scheme. The invention aligns this capability with the native host system support for "hot-plug" of wireless PCI and PCI Express devices.

Hot-plug is a term that collectively includes "hot-add" and "hot-removal" of a resource from a host PCI-based system. Although hot-plug is intended as a protocol for adding and removing adapter cards from expansion slots, this capability may be viewed from the perspective that it is an "ad hoc I/O resource" capability that could be adapted for wireless applications. Hot-plug PCI resources come and go from a system, in a similar fashion to the way devices ingress and egress in ad hoc wireless networks.

The PCI Express Base Specification defines the hot-plug mechanisms that must be implemented. The specification does not allow for "surprise" hot-plug. That is, a user must signal the system prior to adding or removing a resource. The PCI Express Specification defines configuration registers, messaging and hot-plug procedures. The intended purpose is to enable replacement of failed adapter cards without requiring the whole system to be powered down. The hot-plug procedures allow the operating system to continue running during removal and replacement. The procedures include an orderly shutdown and restart of associated drivers and software. Hot-plug isolation control logic and a Hot-Plug Controller ensure that power is removed gracefully. There is an associated programming interface for the PCI Hot-Plug Controller.

The invention advantageously adapts this ad hoc resource add/removal to a wireless link and wireless endpoint. The adaptation allows mobile PCI Express resources to ingress and be allocated system resources within a host's PCI system, and then egress and have the allocated resources freed up for re-use/reassignment, emulating the hot plug insertion and removal of an adapter card.

It is desirable to leave the host system hot-plug software protocol intact and unmodified, thus pushing any protocol modification out to the Host Bus Adapter and Remote Bus Adapter (embedded in a wireless mobile device). The software elements of the PCI Express protocol include Hot-Plug Service, Hot-Plug System Driver, and the particular device driver associated with a wireless mobile PCI function. These elements remain functional, such that a wireless ad hoc adaptation remains transparent to the system.

The hardware elements of the PCI hot-plug mechanism include the Hot-Plug Controller—which responds to commands from the Hot-Plug System driver—as well as assorted power switching, reset, attention button, and other indicators/ logic associated with the requirements of a circuit card adapter resident in a bus slot. These hardware elements— necessary to facilitate adapter cards—are not required for a wireless ad hoc adaptation. There is no hard requirement to power up and power down a wireless function to physically add or remove the resource, since it is typically battery powered and removing the device may be accomplished by simply exiting the piconet. However, the key component at the adapter—the Hot-Plug Controller—must be accounted for as the Hot-Plug System Driver expects the resource to handshake according to protocol. Thus, the invention includes a remote wireless mobile PCI function "Hot-Plug Handler" to respond as expected and interpret the driver commands to configure the wireless device so that it enters and exits the system in compliance with the hot-plug protocol. The operation system responds by allocating and de-allocating memory space, IO space and interrupts as if the wireless mobile PCI function were a simple adapter card.

The Hot Plug Handler is implemented as a function within the i-PCI Protocol logic 306 located in the RBA of a mobile remote I/O 302 containing a wireless mobile PCI function 308. The Hot Plug Handler provides status and configuration registers normally associated with the Hot Plug Controller as defined by the PCI Express specification, but the behavior is modified for the wireless ad hoc environment. The behavior of the Hot-Plug Handler is summarized as follows via a generalized hot-plug sequence of events:

For mobile resource ingress: 1) The mobile resource enters the range of the piconet. The Hot Plug Handler generates the equivalent of the conventional PCI "attention" button signal which notifies the Hot-Plug Service that the resource is present. The Hot Plug Handler sets the appropriate status register bits in its configuration register, which causes a system interrupt to be sent to the Host Root Complex, in accordance with the PCI protocol. Hot-plug software then reads the status from the configuration register and recognizes the request to be added to the host system. 2) The Hot-Plug Service issues a request to the Hot-Plug System Driver, commanding the Hot Plug Handler to blink an indicator light on the mobile device to inform the user not to remove the device from the piconet. The indicator continues to blink while the Hot Plug software validates the request. 3) The Hot Plug Service then issues a request to the Hot Plug System Driver to turn the "slot on". The Hot Plug Handler receives the request to turn the "slot on", which it interprets as a command to enable the mobile PCI function section of the mobile I/O, since there is typically no actual slot. The indicator is changed from blinking to steady on. 4) The host operating system then configures the mobile PCI device and functions by assigning the necessary resources, just as if the mobile I/O were a normal PCI or PCI Express adapter card. 5) The host operating system determines the driver associated with the mobile PCI device and functions using the vendor ID and device ID configuration register values as the search criteria. 6) The host operating system then calls the device driver's initialization code entry point and the device driver finishes the setup and enables the mobile PCI resources. The end result is new PCI resources have been added to the host system via the ingress of the mobile remote I/O.

For mobile resource egress: 1) The mobile device issues a request to leave the host by having the Hot-Plug Handler generate the equivalent of the conventional PCI "attention" button signal which notifies the Hot-Plug Service that the resource is leaving the piconet. As a result of this signal, the Hot Plug Service calls the Hot Plug System Driver, which reads the Hot Plug Handler status register to confirm the resource is really leaving the piconet. 2) The Hot Plug Service issues a request to the Hot-Plug System Driver to command the Hot Plug Handler to blink the indicator light on the mobile device to inform the user not to remove the device from the piconet yet. The indicator continues to blink while the Hot Plug software validates the request. 3) The Hot Plug Service utility then commands the driver for the remote I/O PCI device and functions to terminate. 4) Host software then commands the Hot Plug Handler to turn off the power to the "slot" which it interprets as a command to disable the mobile PCI device and functions. The Hot Plug Handler then turns off the indicator light, indicating to the user that host OS has completed the removal of the resources and the mobile I/O may now safely leave the piconet. 5) The host operating system then de-allocates the memory space and I/O space that had been assigned to the mobile remote PCI resources. The end result is resources have been successfully removed from the host system via the egress of the mobile remote I/O.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A system configured to adapt an existing hot-plug protocol intended for adding and removing a physical device to and from a computer expansion slot of a host computer having a native I/O standard, and enable adding and removing a wireless device to and from the computer expansion slot by emulating a hot-plug mechanism, comprising:
   a host bus adapter card adapted to the host computer native I/O standard, configured to encapsulate/un-encapsulate data of the host computer, configured to interface the data to a wireless link;
   a remote bus adapter having an interface configured to exchange the data with the adapter card via the wireless link, configured to encapsulate/un-encapsulate the data, and adapted to the host computer native I/O standard and accommodate various endpoint devices and functions; and
   a wireless mobile PCI function Hot-Plug Handler configured to respond as expected by the host computer, and interpret driver commands intended for the adapter card and configure the wireless device so that it functionally enters and exits the host computer in compliance with the existing hot-plug protocol.

2. The system as specified in claim 1 wherein the existing host computer hot-plug protocol is intact and unmodified, and any protocol modifications are pushed out by the host computer to the host bus adapter and remote bus adapter.

3. The system as specified in claim 1 wherein the wireless link is based on 802.15.3 standard as defined by IEEE.

4. The system as specified in claim 1, where the hot-plug protocol is defined by PCI or PCI Express.

5. The adapter card as specified in claim 1 wherein the adapter card comprises a Media Access Control (MAC), a baseband processor (BBP), an RF transceiver, and an antenna.

6. An adapter card configured to enable ad hoc addition and removal of a mobile wireless resource to and from a host computer I/O subsystem, wherein the adapter card is configured to emulate an existing hot-plug mechanism for a physical device in real-time.

7. The adapter card as specified in claim 6 wherein the adapter card is configured to encapsulate/un-encapsulate data of the host computer, and configured to interface the data to a wireless link.

8. The adapter card as specified in claim 6 wherein the host computer has a native I/O standard, and the adapter card is adapted to the native I/O standard.

9. The adapter card as specified in claim 8 wherein the native I/O standard comprises PCI or PCI Express.

10. The adapter card as specified in claim 9 wherein the adapter card is configured to exchange data via a wireless link based on 802.15.3 standard as defined by IEEE.

11. The adapter card as specified in claim 6 wherein the wireless resource includes a Hot-Plug Handler function configured to respond as expected by the host computer and interpret driver commands intended for the wireless resource.

12. The adapter card as specified in claim 11 wherein the Hot-Plug Handler function is configured to configure the wireless resource so that it functionally enters and exits the host computer in compliance with an existing hot-plug protocol associated with a hardwired resource.

13. The adapter card as specified in claim 6 further comprised of support for one or more wireless resources that include a Hot-Plug Handler function configured to respond as expected by the host computer and interpret driver commands intended for the wireless resource and configured to configure the wireless resource so that it functionally enters and exits the host computer in compliance with an existing hot-plug protocol normally associated with a hardwired resource.

14. The adapter card as specified in claim 13 wherein the adapter card is configured to encapsulate/un-encapsulate data of the host computer, and configured to interface the data to a wireless link.

* * * * *